United States Patent [19]

Hashimoto

[11] Patent Number: 4,753,310
[45] Date of Patent: Jun. 28, 1988

[54] ELECTRIC POWER STEERING DEVICE

[75] Inventor: Akio Hashimoto, Kawasaki, Japan

[73] Assignee: Aisin Seiki Kabushiki Kaisha, Japan

[21] Appl. No.: 910,294

[22] Filed: Sep. 17, 1986

Related U.S. Application Data

[63] Continuation of Ser. No. 539,237, Oct. 5, 1983, abandoned.

[30] Foreign Application Priority Data

Oct. 5, 1982 [JP] Japan ............................. 57-174753

[51] Int. Cl.⁴ ............................................. B62D 5/04
[52] U.S. Cl. ................................................ 180/79.1
[58] Field of Search .................. 180/79.1, 141, 142, 180/143; 73/862.33

[56] References Cited

U.S. PATENT DOCUMENTS

| | | | |
|---|---|---|---|
| 2,356,492 | 8/1944 | Smith | 180/142 |
| 2,754,465 | 7/1956 | Brier | 180/79.1 X |
| 2,869,383 | 1/1959 | Rapp et al. | 180/79.1 X |
| 3,656,043 | 4/1972 | Kawada et al. | 318/588 |
| 3,820,619 | 6/1974 | Ezoe et al. | 180/142 |
| 3,821,625 | 7/1974 | Scholl | 318/624 |
| 3,939,938 | 2/1976 | Inoue | 180/142 |
| 3,955,130 | 5/1976 | Graf | 318/332 |
| 3,983,953 | 10/1976 | Bayle | 180/79.1 |
| 3,995,205 | 11/1976 | Klees | 318/588 |
| 4,034,415 | 7/1977 | Suer | 361/24 |
| 4,066,945 | 1/1978 | Korte, Jr. | 318/681 |
| 4,246,622 | 1/1981 | Hosoda et al. | 361/95 |
| 4,262,239 | 4/1981 | Kawa | 318/561 |
| 4,290,000 | 9/1981 | Sun | 318/566 |
| 4,300,080 | 11/1981 | Lee | 318/563 |
| 4,300,081 | 11/1981 | Van Landingham | 318/599 |
| 4,301,396 | 11/1981 | Bourke | 318/490 |
| 4,415,054 | 11/1983 | Drutchas | 180/79.1 |
| 4,448,275 | 5/1984 | Kitagawa et al. | 180/79.1 |
| 4,453,615 | 6/1984 | Kanazawa et al. | 180/142 |
| 4,457,390 | 7/1984 | Abe et al. | 180/142 |
| 4,471,278 | 9/1984 | Matouka | 318/561 |
| 4,471,280 | 9/1984 | Stack | 180/79.1 X |
| 4,520,777 | 6/1985 | Hatori et al. | 180/142 X |
| 4,527,653 | 7/1985 | Agarwal et al. | 180/79.1 |

FOREIGN PATENT DOCUMENTS

| | | | |
|---|---|---|---|
| 0124790 | 11/1984 | European Pat. Off. | |
| 53-119529 | 10/1978 | Japan | 180/79.1 |
| 57-144168 | 9/1982 | Japan | 180/143 |
| 58-8467 | 1/1983 | Japan | 180/79.1 |

*Primary Examiner*—John J. Love
*Assistant Examiner*—Charles R. Watts
*Attorney, Agent, or Firm*—Sughrue, Mion, Zinn, Macpeak and Seas

[57] ABSTRACT

An electric power steering device for vehicles comprises an electric motor connected to a steering shaft and serving as a servomotor for producing assisting steering power. Torque sensors are adapted to sense steering torque on the steering shaft. A vehicle speed detecting means is adapted to detect the actual vehicle speed. A controller is adapted to control the state of energization of the electric motor such that the output torque of the motor is changed in accordance with the change in the steering torque on the steering shaft and that the energization of the motor is stopped when the actual vehicle speed is increased beyond a predetermined threshold speed which is adjustable by a vehicle speed setting means such as a variable resistor.

8 Claims, 7 Drawing Sheets

ELECTRIC POWER STEERING DEVICE

This is a continuation of application Ser. No. 539,237, filed Oct. 5, 1983, which is now abandoned.

BACKGROUND OF THE INVENTION

The present invention relates to an electric power steering device having an electric motor for producing assisting steering power.

An extremely large manual force is required for changing the direction of wheels of a vehicle by rotating a steering wheel when the vehicle is not running or running at a low speed. This problem is serious particularly in so-called FF vehicles (front engine front-wheel drive vehicles) which are now becoming popular, because in such vehicles a large weight is applied to the front wheels.

Power steering devices are known as devices for assisting the driver in maneuvering the steering wheel. Briefly, such a device provides a driving force in response to the manual steering force exerted by the driver and transmits the driving force to the steering device. Although various power steering devices have been put into practical use up to now, most of such power steering devices are of the hydraulic type. The hydraulic type power steering device has parts such as a control valve, hydraulic cylinders and so forth, and is adapted to produce an assisting steering power by displacing working oil in accordance with the steering force.

The hydraulic power steering devices, however, suffer from the following disadvantages. Namely, the constituents such as the control valve, the hydraulic cylinder and so forth are generally large in size. The pipes through which fluid is supplied to these constituents have to be bent at a radius of curvature greater than a predetermined radius in order to prevent a large pressure drop for the oil. Furthermore, it is necessary to incorporate seals for preventing leaking of oil. In addition, it is very difficult to handle the device as a whole during mounting. For these reasons, the hydraulic type power steering device is not suited to vehicles having only a small mounting space as in the case of the FF vehicles.

FIG. 1 shows a relationship between the power required for the steering and the vehicle speed. It will be understood that a large steering power is required when the vehicle speed is low and, as the vehicle speed is increased, the power required for the steering is decreased gradually. Therefore, in the conventional power steering devices in which a constant effect is produced regardless of the vehicle speed, the steering device becomes too sensitive to the manual steering force when the vehicle is running at a high speed, although a moderate assisting effect is obtained when the vehicle speed is low. This may cause a danger that the driver who is not familiar with the power steering device applies too large a manual force on the steering wheel. Even the drivers who are well trained in power steering driving prefer to be required to exert a large maneuvering force during high-speed running of the vehicle. To cope with this demand, a power steering device has been proposed in which the assisting steering power is changed in accordance with a change in the vehicle speed. Such an improved power steering device, however, requires a highly complicated steering device resulting in a raised cost of production.

SUMMARY OF THE INVENTION

Accordingly, a first object of the invention is to provide a power steering device improved to decrease the change in the steering feel due to a change in the vehicle speed.

A second object of the invention is to provide, at a low cost, an electric power steering device for producing assisting steering power which is optimized in relation to the vehicle speed.

To these ends, according to the invention, there is provided a power steering device having an electric motor such as a D.C. motor as the driving power source, a torque sensor for sensing the manual steering force so that the electric motor produces a torque in accordance with the steering torque, and a vehicle speed sensor which produces a signal to stop the energization of the electric motor when the vehicle speed exceeds a predetermined speed V. The vehicle speed V is set through a manually operable vehicle speed setting means such as a variable resistor, key-type input device or voice recognition device. Once the driver sets the vehicle speed V at the desired level, when the vehicle speed is below the level V and requires a large steering power, the electric motor produces assisting steering torque in accordance with the manual steering torque exerted by the driver to permit the driver to maneuver the steering wheel with reduced manual force. To the contrary, when the vehicle speed exceeds the level V, the electric motor is automatically de-energized to prevent any excessive unburdening of the driver during high-speed running of the vehicle. As compared with a vehicle where no electric power steering device is provided, the force of inertia of mechanisms connected to the steering shaft, such as the electric motor and so forth, acts to resist the manual torque exerted on the steering wheel, so that a greater force is required for maneuvering the steering wheel. Namely, the torque required for the steering is increased to impart a better steering feeling in the high-speed running of the vehicle.

In the electric power steering device, it is often required that the motor produces a torque even when the rotor of the motor is not rotating, as in the case of running along a curve. In general, however, the electric current supplied to the electric motor such as a D.C. motor is abnormally increased when the rotor is not rotating tending to cause a burning out of the electric motor. According to a preferred form of the invention, therefore, the motor is controlled through a pulse width modulation.

The invention will be described hereinafter with reference to the accompanying drawings.

BRIEF DESCRIPTION OF THE DRAWINGS

FIG. 3b is a perspective view of a steering system which is connected to the device as shown in FIG. 3a;

DESCRIPTION OF THE PREFERRED EMBODIMENTS

Figure 1:
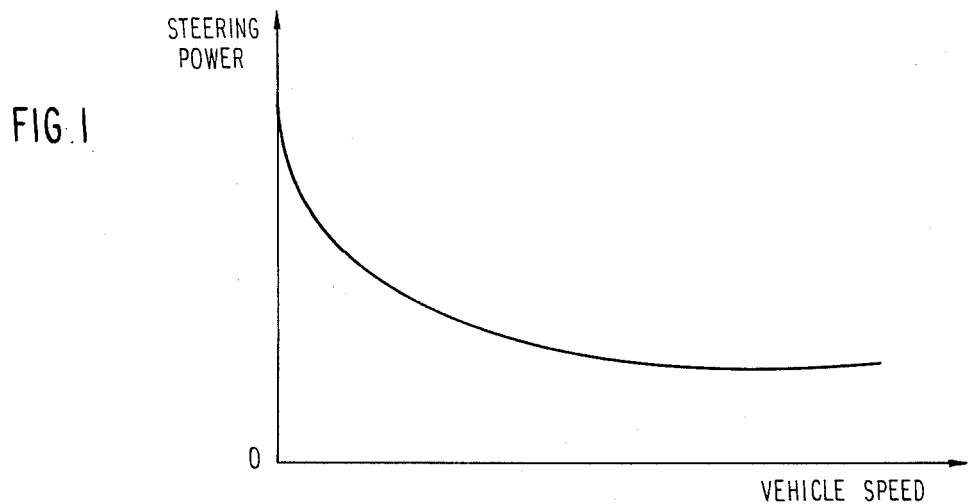
FIG. 1 is a graph showing the relationship between the vehicle speed and the steering power as observed in a vehicle having no power steering device.
Figure 2:
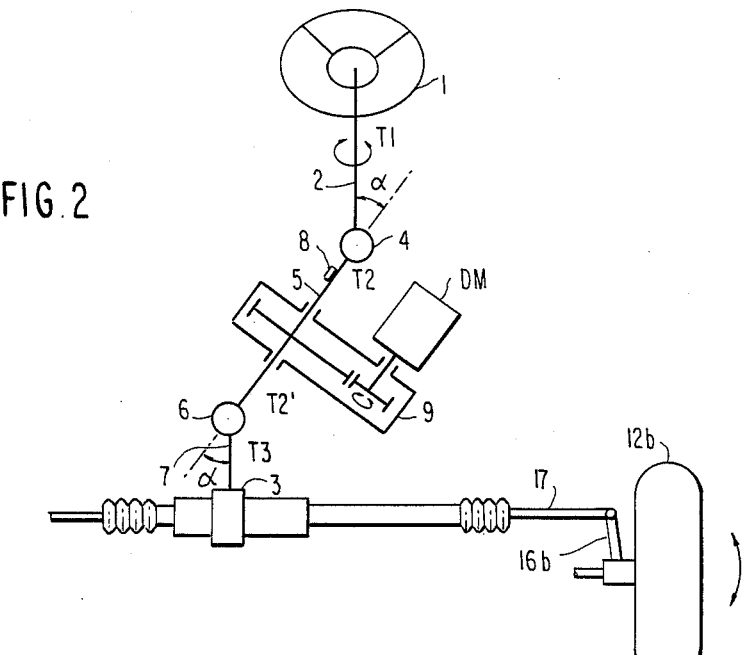
FIG. 2 is a schematic block diagram of an embodiment of the electric power steering device in accordance with the invention.
Figure 3B:
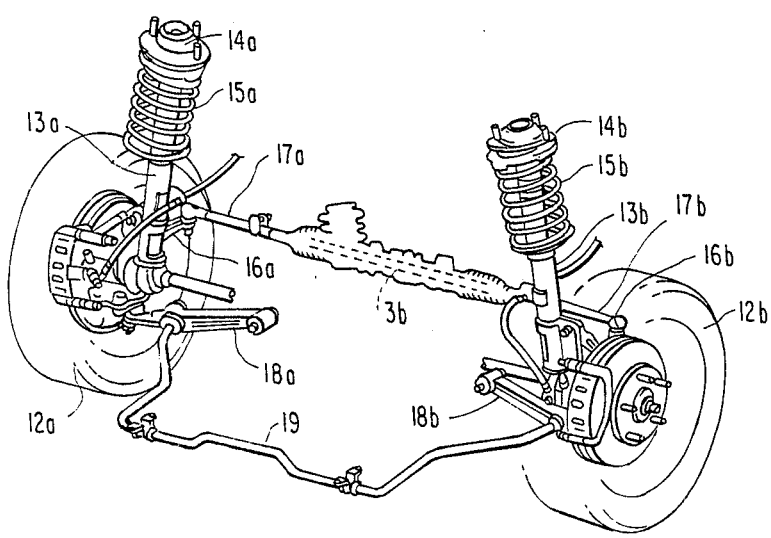
Figure 3A:
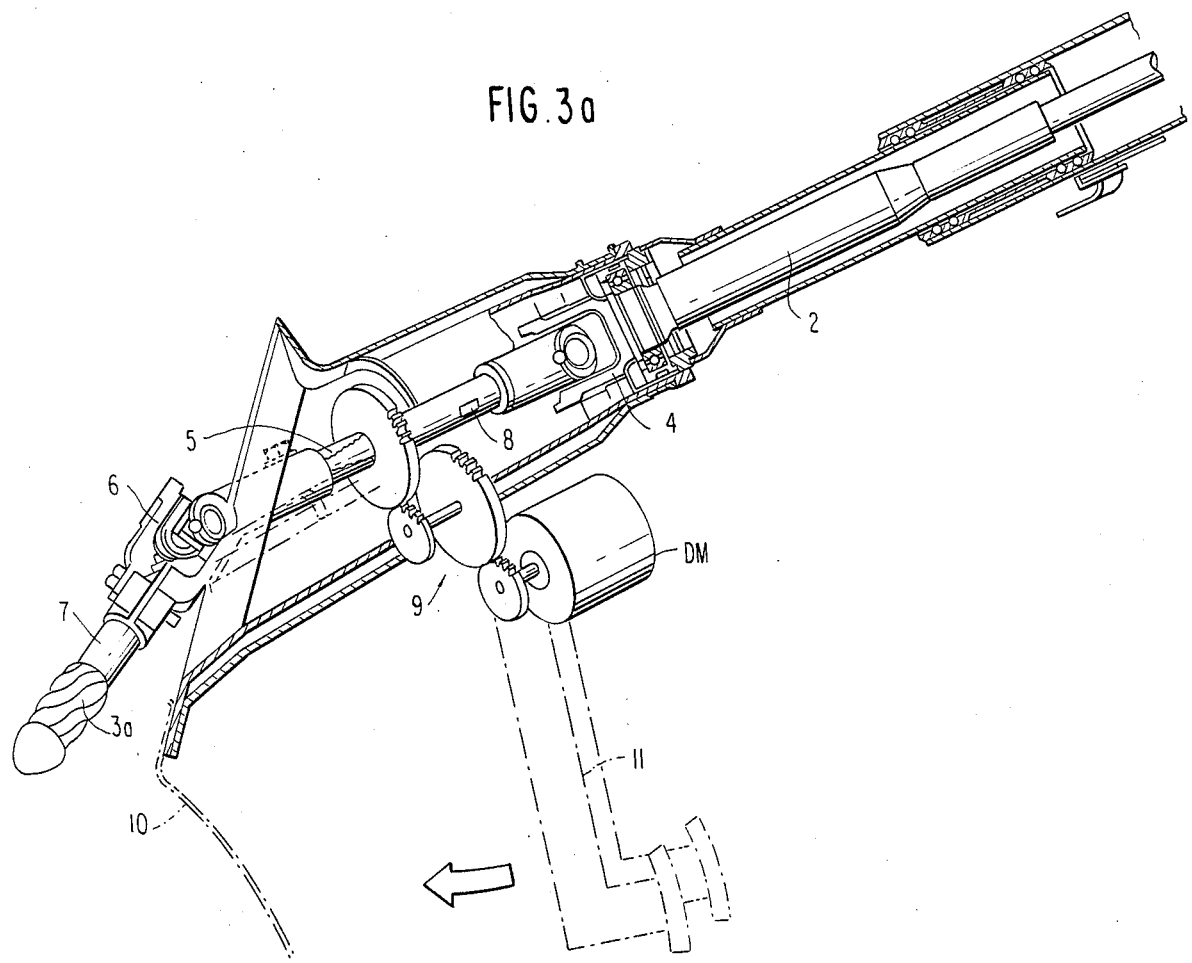
FIG. 3a is an enlarged sectional view of an essential part of the electric power steering device as shown in FIG. 2.

Referring first to FIG. 2 schematically showing the construction of an embodiment of the invention, a steering wheel 1 is connected to a first steering shaft 2 which in turn is connected through a first universal joint 4 to a second steering shaft 5. The second steering shaft 5 is connected to a D.C. servomotor DM through a reduction gear 9. The second steering shaft 5 is provided at its portion closer to the steering wheel than to the reduction gear 9 with a torque sensor 8. A third steering shaft is connected through a second universal joint to a third steering shaft 7. As shown in FIG. 3a, a pinion gear 3a is connected to the end of a steering shaft 7. The pinion gear 3a is engaged by a steering driving rack 3b as shown in FIG. 3b. The angle α formed between the first steering shaft 2 and the second steering shaft 5 is equal to the angle α formed between the second steering shaft 5 and the third steering shaft 7.

FIGS. 3a and 3b show the details of the mechanism shown in FIG. 2. FIG. 3a is a sectional view of the construction around the driver's foot. The reduction gear 9 employed in the described embodiment incorporates four gears in combination. The reduction gear 9 transmits the torque of the D.C. servomotor DM to the second steering shaft 5 while reducing the rotation speed to 1/6. The torque sensor 8 used in this embodiment is constituted by a strain gauge. Although the drawings show only one strain gauge, another torque sensor is fixed to the rear side of the second steering shaft 5. Namely, in this embodiment, the force required for rotating the steering wheel is detected through sensing the torsion of the shaft 5. Each of these torque sensors 8 is provided with two sensors having different detecting orientations. In this embodiment, in order to eliminate any influence of the temperature, these four sensors are connected to form a bridge circuit as will be described later. FIG. 3a shows the portion of the steering wheel device near the second universal joint 6 and extending over two sections which are separated from each other by a toe board 10. The space defined at the left side of the toe board 10 as viewed in FIG. 3a is the engine room, while the space defined at the right side is a passenger compartment. In this embodiment, the constituents such as the D.C. servomotor DM, torque sensor 8 and so forth are mounted in the passenger compartment so that they are not affected by the heat from the engine room. A reference numeral 11 designates a brake pedal.

Referring now to FIG. 3b, the axles of the front wheels 12a and 12b of the vehicles are supported by means of suspension upper supports 14a and 14b through shock absorbers 13a and 13b, respectively. Coiled springs 15a and 15b are disposed between the shock absorbers 13a and the suspension upper support 14a and between the shock absorber 13b and the suspension upper support 14b, respectively. Steering knuckle arms 16a and 16b are connected to the bearings of the wheels 12a and 12b and are coupled to the rack 3b through tie rods 17a and 17b, respectively. As stated before, the rack 3b meshes with the pinion 3a. Numerals 18a and 18b denote lower suspension arms, while a numeral 19 designates a stabilizer.

Figure 4:
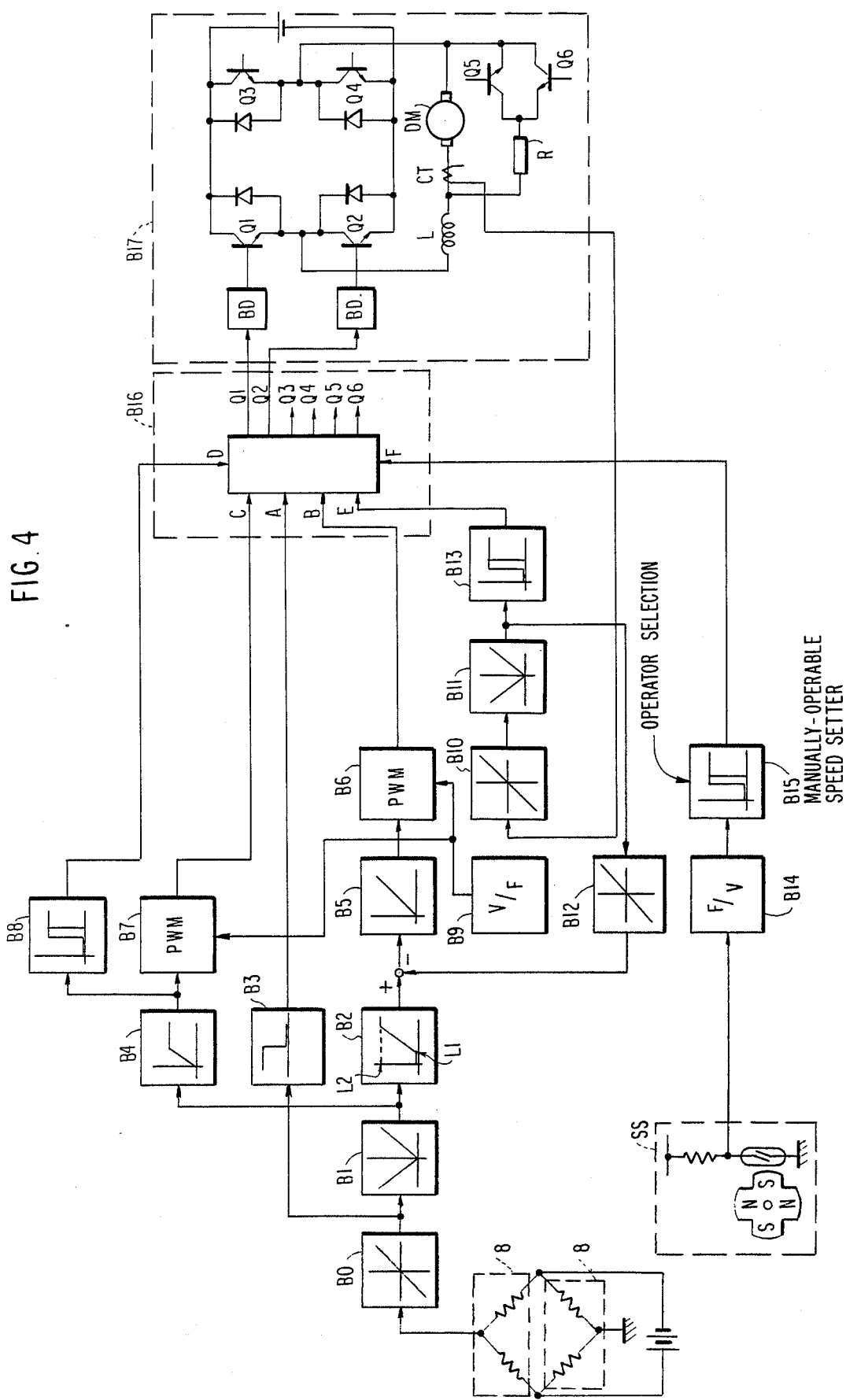
FIG. 4 is a schematic block diagram of an electric circuit incorporated in the power steering device as shown in FIG. 2.
Figure 5:
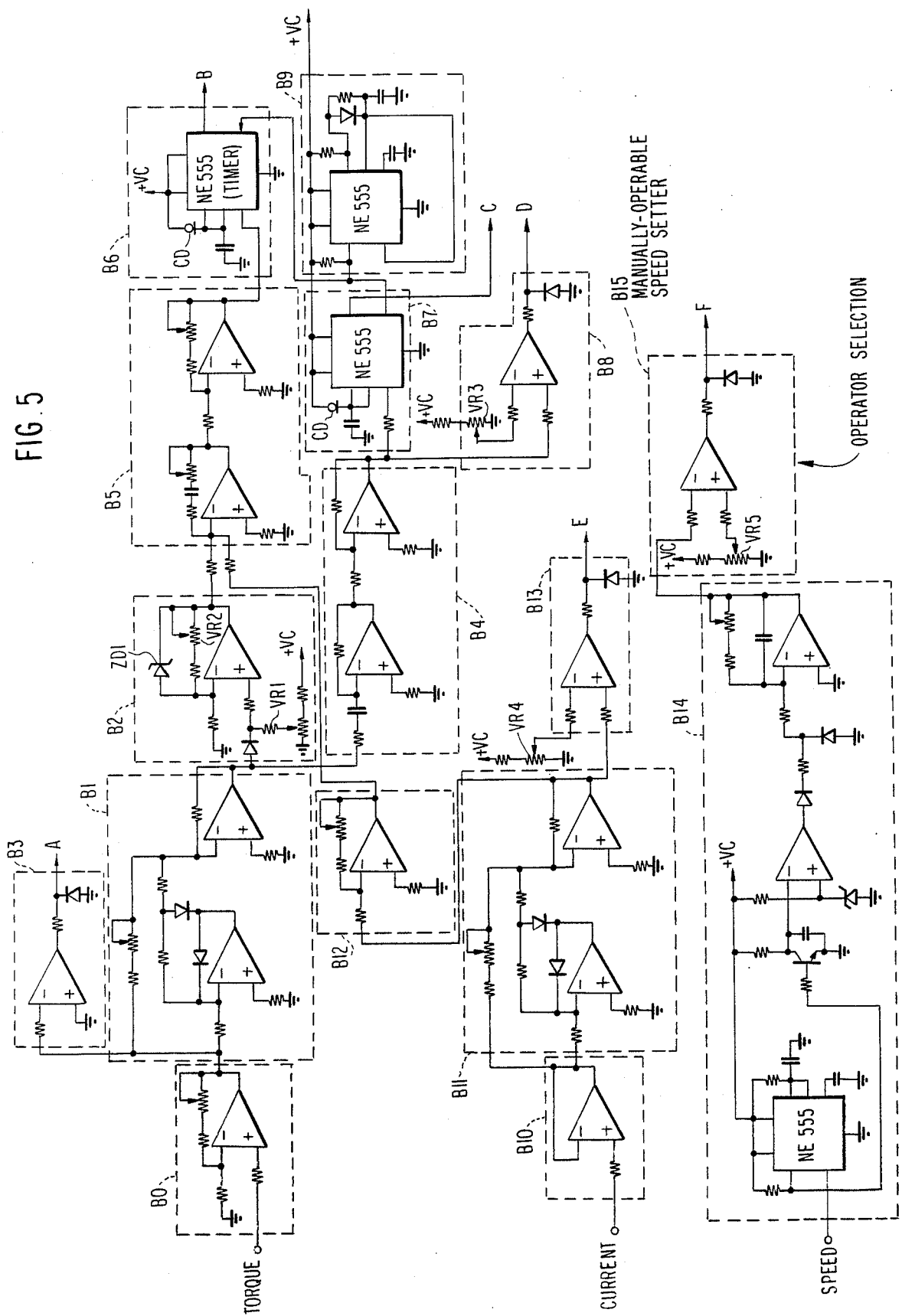
FIG. 5 is an electric circuit diagram showing the detail of a portion of the electric circuit as shown in FIG. 4.
Figure 6:
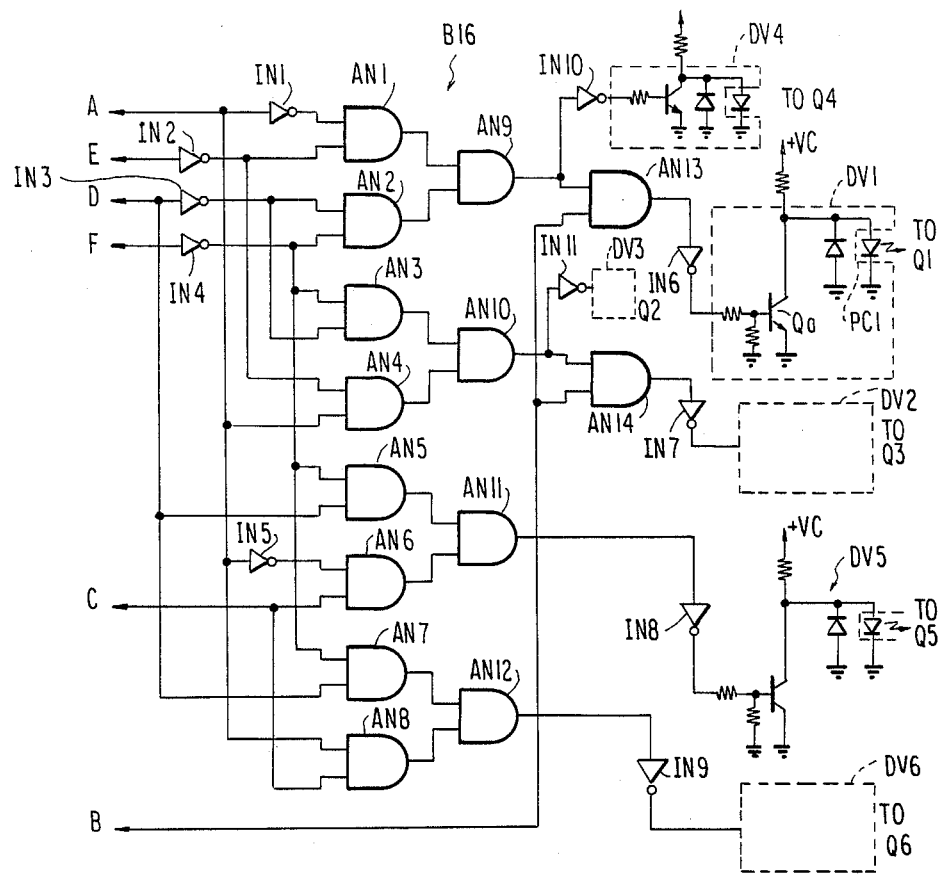
FIG. 6 is a block diagram showing the detail of a part of the electric circuit as shown in FIG. 4.

FIG. 4 schematically shows the electric circuit arrangement of the electric power steering device as shown in FIG. 2. Details of essential portions of the circuit of FIG. 4 are shown in FIGS. 5 and 6. The graphs in respective blocks of FIG. 4 show the electric characteristics of respective blocks. In FIG. 5, small rectangles show resistors. Two torque sensors 8 are connected to form a resistance bridge which is connected at its output end to the block B0. The block B0 is usually an ordinary linear amplifier. The output end of the block B0 is connected to two blocks B1 and B3. The block B1 is an absolute value circuit which is adapted to effect a linear amplification regardless of the polarity of the input signal. The block B2, which is an amplifier, operates as a function generator which produces an output "0" when the input level is below L1 and performs a linear amplification while the input level is higher than L1 until the output level reaches L2, but the output level is not increased beyond L2 even if the input level is further increased. The level L2 is a value which is determined by the operation characteristics of a Zener diode ZD1, while the level L1 can be adjusted freely by means of a variable resistor VR1. The level L1 is for determining the level of an insensitive zone which will be mentioned later. The amplification factor in the block B2 is adjustable by means of a variable resistor VR2. Namely, the share or ratio between the manual force required for the steering and the power produced by the electric motor DM can be adjusted by means of the variable resistor VR2. The output signal from the block B2 is added to the block B5 through an adder. The block B5 is a linear amplifier which serves as an error amplifier. The output end of the block B5 is connected to the modulation input end of the block B6. The block B6 is a pulse width modulation circuit which is adapted to modulate the rectangular wave produced by a block 9 into pulses of a pulse width corresponding to the control signal. In blocks B6 and B7, a symbol CD represents a constant-current diode. The block B9, i.e. the pulse oscillation circuit, is adapted to make an oscillation at an amplitude of 2 KHz. The output end of the bock B6 is connected to the input end B of the block B16. The block B16 is a logical control circuit.

The block B3 connected to the output end of the block B0 is a kind of comparator which is adapted to make a discrimination of polarity. Namely, the block B3 produces at its output end a logical level which varies depending on whether the sensed torque is positive or negative, i.e. depending on the direction of rotation of the steering wheel 1. The output end of the block B3 is connected to the input terminal A of the block B16.

A block B4 connected to the output of the block B1 is a differentiation circuit which is adapted to detect an abrupt change in the steering operation. Blocks B7 and B8 are connected to the output end of the block B4. A block B7 is a pulse width modulation circuit which, as is the case of the block B6, receives rectangular waves from the block B9 and modulates the pulse width of the received signal in accordance with the control signal. The output end of the block B7 is connected to the input end C of the block B16. A block B8 is a comparator the comparison level of which is adjustable by means of a variable resistor VR3. The output end of the block B8 is connected to the input terminal D of a block B16. These blocks B4, B7 and B8 operate effectively when the torque of the electric motor DM is decreased abruptly.

The block B10 is adapted to be supplied with feedback signal corresponding to the electric current flowing in the D.C. servomotor DM. A block B10 is a linear amplifier which is adapted to deliver its output to an absolute value circuit B11. The output end of the absolute value circuit B11 is connected to the blocks B12 and B13 which are a linear amplifier and a comparator, respectively. The output signal from the amplifier B12 is added to or subtracted from the input to the block B5. A block B13 is a comparator which detects any overload (abnormal current) in the servomotor DM. The comparison level in the comparator B13 can be adjusted by means of a variable resistor VR4. A symbol SS represents a speed sensor. In this embodiment, the speed sensor SS is composed of a magnet and a lead switch. The magnet is connected to the speed meter cable so as to be rotated at a speed proportional to the speed of rotation of the axle. The lead switch is opened and closed by the rotation of the magnet so as to produce a pulse signal of a frequency corresponding to the vehicle speed. The signal is applied to an F/V (frequency/voltage) conversion circuit B14 the output of which is fed to the input end F of a block B16 through a comparator B15. The block B15 is provided with a variable resistor VR5 by which the comparison level is adjusted. The variable resistor VR5 has a manipulation knob which is positioned within the reach of the driver. In this embodiment, the comparison or critical vehicle speed can be varied linearly within the range of between 20 and 50 Km/h.

Switching transistors for the electric power control are connected through the output ends of the logical control circuit B16 through base drivers BD. The transistors Q1, Q2, Q3 and Q4 are for driving the D.C. servomotor DM. These transistors are arranged in a manner for permitting the change of polarity, i.e. in the form of a bridge. More specifically, as two transistors on a diagonal line are turned on, electric current is supplied to the servomotor DM at a predetermined polarity. Transistors Q5 and Q6, which are used in braking, are connected in series to a resistor R. The series circuit is connected in parallel to the servomotor DM. A symbol CT represents a current transformer for detecting the load current, while L represents a D.C. reactor for preventing the interruption of the motor current due to the pulse width control.

Referring now to FIG. 6, a logical control circuit B16 is composed of AND gates AN1-AN14, inverters IN-1-IN11 and drivers DV1-DV6. The drivers DV1 to DV6 have an identical construction. The driver DV1 is composed of a transistor Qa, a photo-coupler PC1 having light-emitting diode, and so on. Photodiodes constituting pairs with the light-emitting diodes of the photo-couplers of the drivers DV1 to DV6 are contained by a base driver BD which is adapted to drive the base of the transistors Q1 to Q6.

Figure 9:
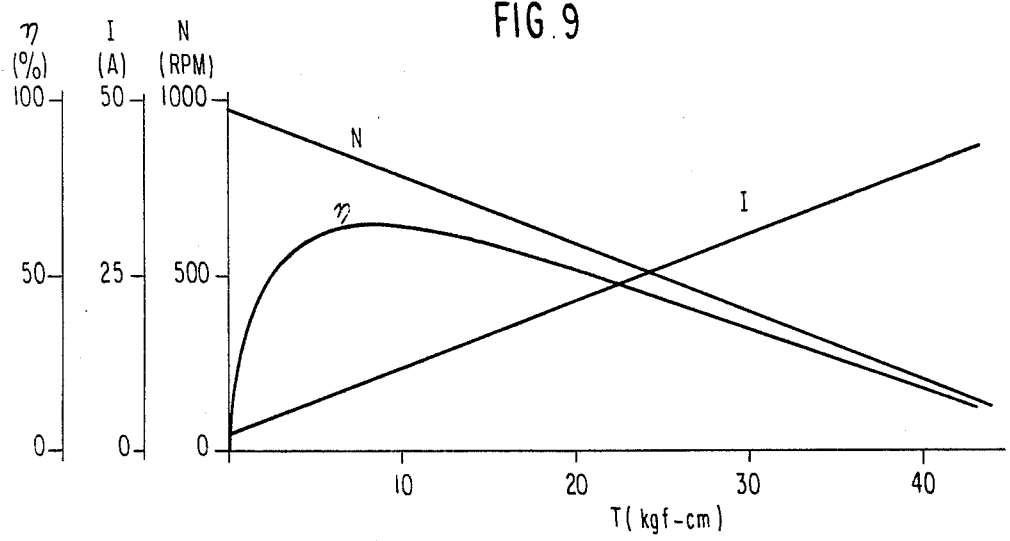
FIG. 9 is a graph showing the operation characteristics of a D.C. servomotor DM incorporated in the device of the embodiment.
Figure 7:
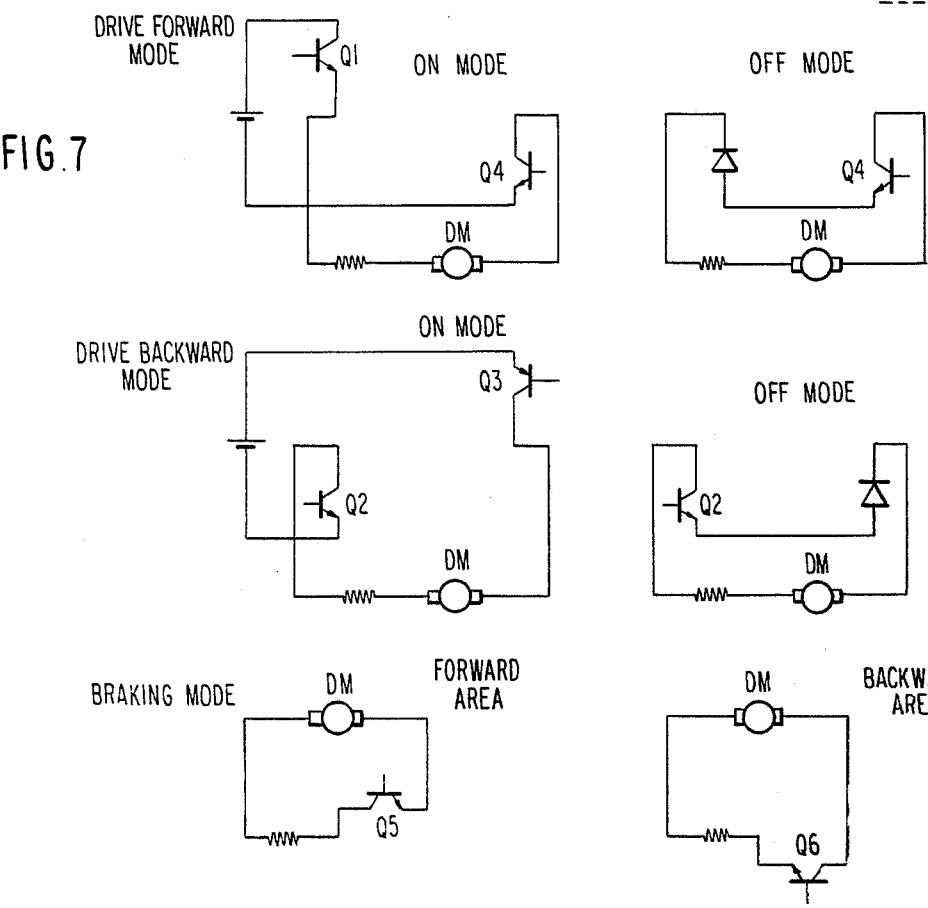
FIG. 7 is a block diagram showing the state of connection of the electric circuit in each mode of operation.
Figure 8:
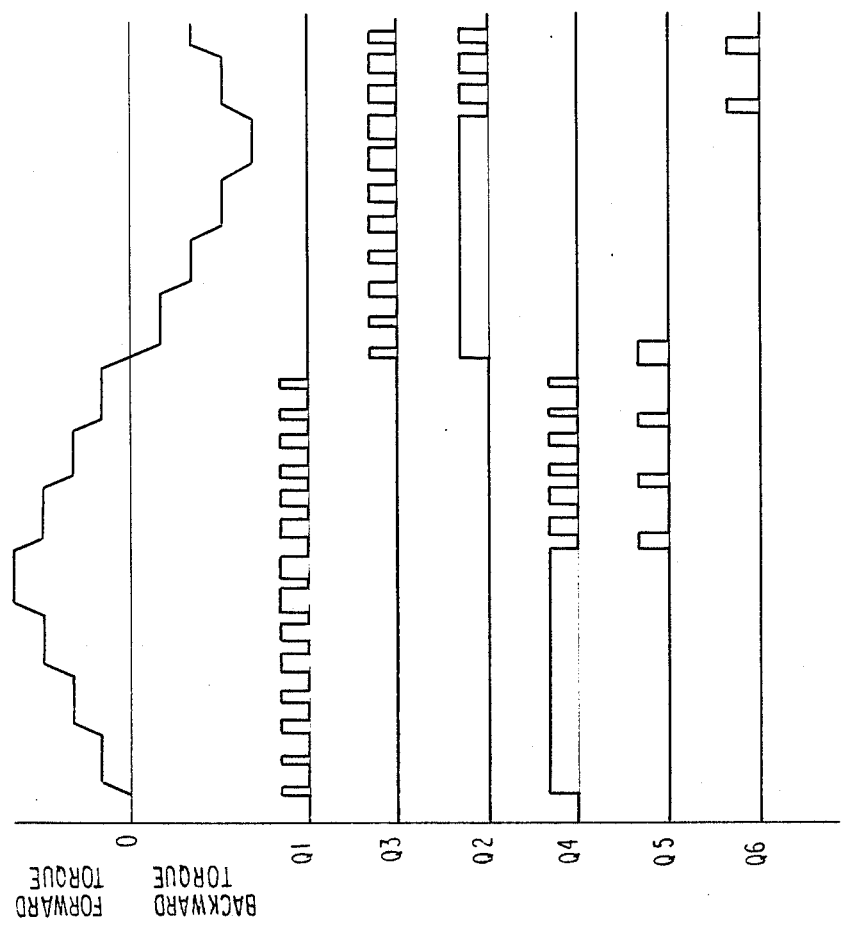
FIG. 8 is a timing chart of operation of the electric circuit shown in FIG. 4.
Figure 10A:
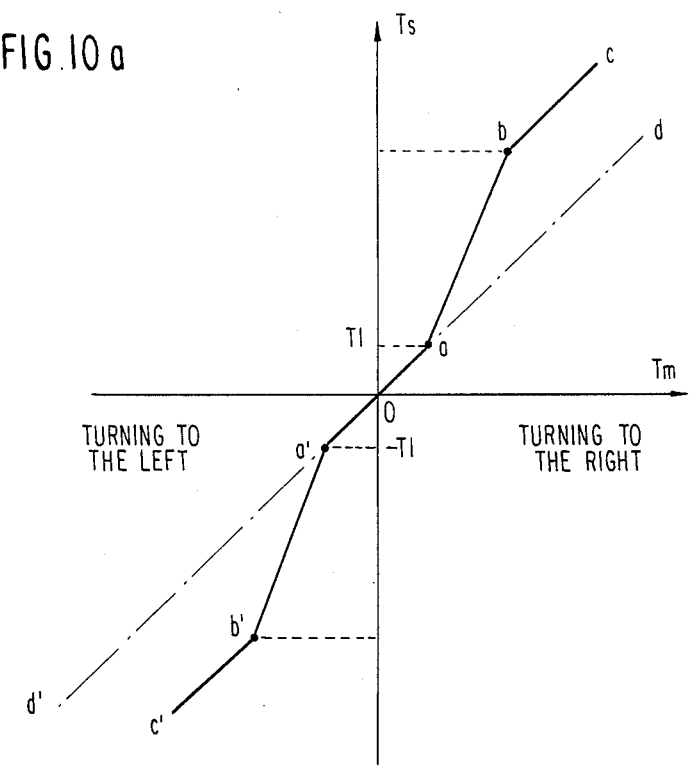
FIG. 10a is a graph showing the relationship between the manual torque exerted by a driver and an output torque derived from the power steering device shown in FIG. 2.
Figure 10B:
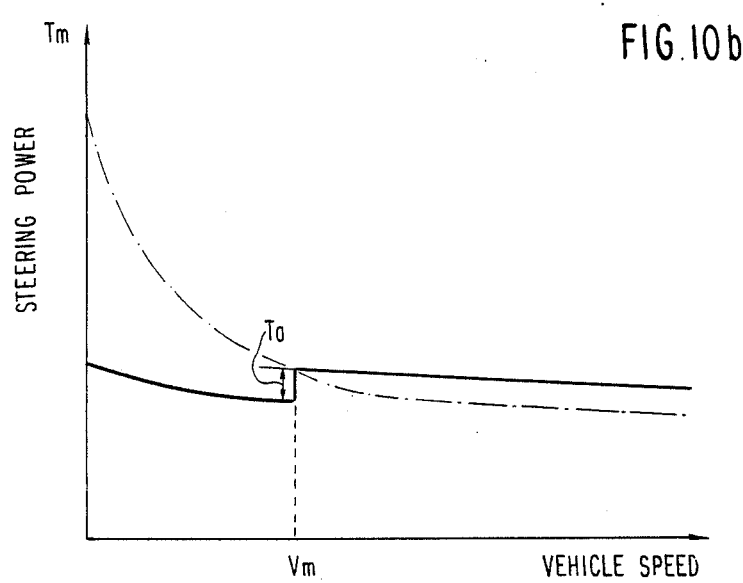
FIG. 10b is a graph showing the relationship between the vehicle speed and the manual steering force in the vehicle mounting the power steering device shown in FIG. 2.

The device described hereinbefore operates in a manner which will be described hereinafter with reference to FIGS. 7 to 10b. Before turning to the description of operation, the Figures referred to in the description will be explained briefly. FIG. 7 shows the connection between the servomotor DM and the transistors which are turned on in respective operation modes, while FIG. 8 shows an example of operation timing. FIG. 9 is a graph showing the operation characteristics of the DC servomotor DM used in the embodiment, such as torque vs. current I, torque vs. rotation speed N and torque vs. efficiency $\eta$. FIG. 10a shows a relationship between manual torque Tm exerted by the driver on the steering wheel and the torque Ts applied to the steering mechanism Ts including the assisting torque produced by the servomotor DM. FIG. 10b shows the relationship between the vehicle speed and the steering power as observed in both of the case where there is no assist by power steering device (two-dot-and dash line) and the case where the power steering device of this embodiment is employed.

When the vehicle speed is lower than the speed Vm set by the variable resistor VR5, the low level L is applied to the input end F of the logical control circuit B16. As the driver rotates the steering wheel with a torque greater than a predetermined torque, the level at the input end A of the circuit B16 is set in accordance with the direction of rotation of the steering wheel. At the same time, pulses of a predetermined width are applied to the input terminal B of the circuit B16. In consequence, the outputs of the AND gates AN1, AN2 and AN9 or the outputs from the AND gates AN3, AN4 and AN10 take logical level "1" in accordance with the direction of rotation of the steering wheel, so that the photo-coupler of the driver DV4 or DV3 is energized. At the same time, the pulses from the pulse width modulation circuit B6 are applied to the driver DV1 or DV2 through the AND gate AN14 and the inverter IN6 or through the AND gate AN14 and the inverter IN7. Assuming here that the pulse is delivered to the driver DV1 for instance, the transistor Qa is turned on and off in accordance with the pulse. The photo-coupler PC1 is energized and de-energized as the transistor Qa is turned on and off, respectively. The drivers which are not in receipt of the pulses are held in an "on" state and, hence, the photo-couplers associated with these drivers are kept de-energized. As the photo-coupler PC1 is energized, the transistors Q1 and Q4 are turned on, so that electric current is supplied as indicated in the drive forward mode and drive backward mode shown in FIG. 7. However, as the photo-coupler is de-energized, the transistor Q1 is turned off and the path of the electric current is interrupted. The electric current supplied to the motor is under a switching control in accordance with the pulse. As a result, the electric power supplied to the motor is changed in accordance with the pulse width so that the motor torque is changed. In case that the pulse is applied to the driver DV2, the transistor Q3 is turned on and off in accordance with the pulse, so that the transistor Q3 is turned on and off to change the connection as in the on mode and off mode of the drive reversing as shown in FIG. 7. The level of the electric current in the motor is detected by the current transformer CT which feeds a signal corresponding to the motor current level back to the pulse width modulation circuit B6, so that the servomotor DM is driven by electric current the level of which corresponds to the manual steering force exerted by the driver on the steering wheel.

In the event that the driver abruptly rotates the steering wheel backwardly, i.e. towards the neutral position, in order to avoid any obstacle which he has found during turning of the vehicle, an abrupt change is caused in the torque detected by the torque sensor. This abrupt change is detected by the comparator 8 and the level of the input end D of the logical control circuit B16 is changed to the high level H. At the same time, a pulse of a width controlled in accordance with the differentiation value of the detected torque is applied to the input terminal C. As a result, the AND gates AN5, AN6 and AN11 of the circuit B16 or the AND gates AN7, AN8 and AN12 of the same applies a pulse signal to the driver DV5 or DV6, in accordance with the direction of rotation of the steering wheel. As a result, as shown in the braking mode shown in FIG. 7, the transistor Q5 or Q6 is turned on or off in accordance with the pulse. When either one of these transistors takes the "on" state, the terminals of the servomotor DM are shortcircuitted through the resistor R to put the brake into effect. The braking effect varies depending on the pulse width, i.e. in the torque change.

The relationship between the manual torque Tm exerted by the driver and the assisting torque Ts produced by the power steering device varies in a manner shown in FIG. 10a. Namely, in the zone between −T1 and T1 determined by the variable resistor VR1, the output from the function generator B2 takes in a "0" level so that no electric current is supplied to the servomotor DM. Therefore, in this zone which will be referred to as "insensitive zone" hereinafter, the assisting steering torque Ts produced by the power steering device takes the same level as the manual steering torque exerted by the driver. As the torque T1 is reached, the function generator B2 starts to produce an output the level of which corresponds to the level of the torque, so that the motor produces an assisting torque which assists the manual steering force exerted by the driver. Namely, the output steering torque is increased by an amount which corresponds to the assisting torque produced by the motor. As the detected torque is increased to the level equal to the maximum torque produceable by the motor, the output level of the function generator B2 is clipped at a constant level so that the motor torque is fixed at such a value. Namely, the motor torque is not changed even if the detected torque is increased further.

Referring now to FIG. 10b, the power required for steering the vehicle is largely varied in accorance with the change in the vehicle speed. An extremely large power is required when the vehicle is not running or is running at a low speed. In the power steering device of the described embodiment, however, the manual steering torque which has to be exerted by the driver is not changed so largely, because the torque produced by the servomotor, which varies in accordance with the steering torque, is added to the torque produced by the manual steering force exerted by the driver. Therefore, the driver can steer the vehicle with comparatively small force even when the vehicle speed is low. However, when the vehicle speed is increased to the level Vm which is set by the variable resistor VR5 and requires no power assist any more, the signal of high level H is applied to the input terminal F of the logical control circuit B16 to stop the energization of the servomotor DM. Therefore, when the vehicle speed Vm is reached, the torque Tm which has to be produced manually is increased by an amount corresponding to the torque Ta produced by the servomotor. Thus, when the vehicle speed is higher than Vm, the steering torque Tm which has to be produced manually by the driver is greater than that in the conventional steering system (see two-dot-and-dash line), by an amount corresponding to the resistance produced by the servomotor Dm, reduction gear 9 and so forth. In general, the torque required for the steering is drastically decreased as the vehicle speed is increased, and the steering can be made only by a small force even though there is a slight increase in the steering resistance. Rather, a moderate resistance, i.e. the torque required for the steering is preferred because it provides a stability or better feel of steering to unburden the driver. The optimum relationship between the steering torque and the vehicle speed depends on the driver. However, in the described embodiment of the invention, the vehicle speed Vm at which the servomotor DM is de-energized is varied within the range of between 20 and 50 Km/h by means of the variable resistor VR5, so that the driver can select the steering feeling which suits him best.

The automatic control system may be a PI controller or a PID controller. The alteration of the kind of the control between PI control and the PID control can be made simply by modifying the elements in, for example, the error amplifier B5.

In the embodiment described hereinbefore, the power steering device is constituted by a combination of a logical control circuit incorporating ordinary logical elements and analog circuits. Obviously, the logical control circuit can be substituted by means of a microcomputer. Similarly, the analog circuits can be replaced with a computer having a high processing speed. The setting of the critical speed Vm, which is conducted by means of a variable resistor in the described embodiment, may be made through a key-type input device arranged for manipulation by the driver or by means of a voice recognition device which is available commercially.

Figure 11:
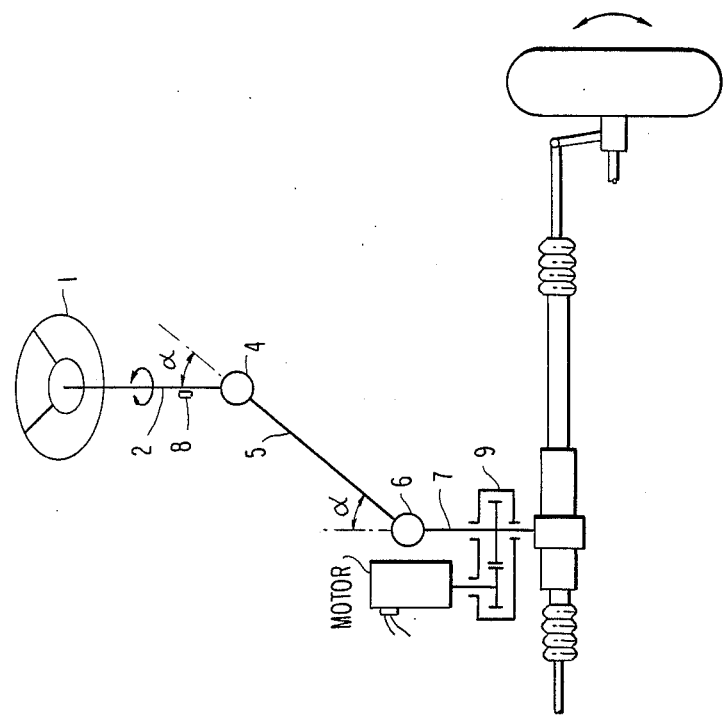
FIG. 11 is a block diagram of another embodiment of the power steering device of the invention.

In the embodiment described hereinbefore, the motor DM, reduction gear 9 and the torque sensor 8 are associated with the second steering shaft. This arrangement, however, is not exclusive and the conventional arrangement may be used instead. For instance, as shown in FIG. 11, it is possible to connect the motor DM and the reduction gear 9 to the third steering shaft 7, while connecting the torque sensor 8 to the first steering shaft 2 or to the third steering shaft 7.

As has been described, according to the invention, it is possible to provide an electric power steering device which can impart an optimum feel of steering to the driver over the whole range of the vehicle speed, with a comparatively simple construction.

What is claimed is:

1. A motor driven power steering system for a vehicle comprising:
    an electric motor;
    torque detecting means for detecting the steering torque applied to a steering shaft by a driver and producing a torque signal;
    electronic control means operatively connected to said motor and said torque detecting means for generating pulses for controlling said motor; wherein said electronic control means comprises:

polarity detecting means for detecting the direction in which the steering torque is applied to said steering shaft and producing a direction signal;

absolute value circuit means for detecting the magnitude of the steering torque and producing a magnitude signal;

function generating means for de-energizing said motor when said magnitude signal is less than a predetermined level;

pulse duration modulation means for controlling the energization of said motor by changing the pulse duration in response to said direction and magnitude signals; and closed loop control means for feeding a signal corresponding to the output of said motor back to the input side of said pulse duration modulation means.

2. A motor driven power steering system as set forth in claim 1 wherein said closed loop control system includes means for stopping the energization of said motor when said signal corresponding to the output of said motor exceeds a predetermined level signal.

3. A motor driven power steering system as set forth in claim 1 wherein said function generating means includes circuit means for delivering an output signal of constant amplitude when the magnitude of the steering torque is greater than a predetermined magnitude.

4. A motor driven power steering system as set forth in claim 1 wherein said control means includes means for detecting an abrupt change in the steering torque and means for shortcircuiting said motor when the abrupt change is detected.

5. A motor driven power steering system as set forth in claim 1 further comprising vehicle speed detecting means, setting means for setting a predetermined vehicle speed and control means for stopping the energization of said motor when the actual vehicle speed exceeds a predetermined speed.

6. A motor driven power steering system for a vehicle comprising:

an electric motor;

torque detecting means for detecting the steering torque applied to a steering shaft by a driver and producing a torque signal;

electronic control means operatively connected to said motor and said torque detecting means for generating pulses for controlling said motor; wherein said electronic control means comprises:

polarity detecting means for detecting the direction of torque detected by said torque detecting means and producing a polarity signal;

absolute value circuit means for detecting the magnitude of torque detected by said torque detecting means and producing an absolute signal;

torque signal processing means for producing a steering torque signal when said absolute signal exceeds a predetermined level;

pulse duration modulation means producing a pulse duration signal in response to said steering torque signal;

logic control circuit means for producing a plurality of predetermined output signals in response to said polarity signal and said pulse duration signal; and motor drive circuit means for supplying load current to said electric motor in response to said output signals of said logic control circuit means.

7. A motor driven power steering system for a vehicle as set forth in claim 6 further including:

current detecting means for detecting the level of current flow through said electric motor and producing a current signal;

wherein said electronic control means includes:

current signal processing means for producing an absolute value signal of current flow through said electric motor in response to said current signal of current detecting means;

differential signal processing means for producing a differential output signal representing the difference between said steering torque signal and said absolute value signal of said current signal processing means; and said pulse duration modulation means producing a pulse signal in response to said differential output signal.

8. A motor driven power steering system for a vehicle as set forth in claim 7 wherein said current signal processing means produces an overcurrent signal when said current signal exceeds a predetermined level; and said logic control circuit means prevents the operation of said electric motor in response to said overcurrent signal.

* * * * *